United States Patent
Talsma et al.

(10) Patent No.: US 9,079,719 B2
(45) Date of Patent: Jul. 14, 2015

(54) POSITIVE-DRIVE SPIRAL CONVEYOR WITH OVERLAPPING CAGE-BAR CAPS

(71) Applicant: Laitram, L.L.C., Harahan, LA (US)

(72) Inventors: Casper Fedde Talsma, Valencia (ES); Alejandro J. Talbott, Marrero, LA (US); Oscar R. Coto, New Orleans, LA (US)

(73) Assignee: Laitram, L.L.C., Harahan, LA (US)

(*) Notice: Subject to any disclaimer, the term of this patent is extended or adjusted under 35 U.S.C. 154(b) by 94 days.

(21) Appl. No.: 14/040,980

(22) Filed: Sep. 30, 2013

(65) Prior Publication Data

US 2015/0090560 A1 Apr. 2, 2015

(51) Int. Cl.
*B65G 21/18* (2006.01)
*B65G 33/24* (2006.01)

(52) U.S. Cl.
CPC .............. *B65G 33/24* (2013.01); *B65G 21/18* (2013.01)

(58) Field of Classification Search
CPC ........................... B65G 21/18; B65G 2207/24
USPC ........................................................ 198/778
See application file for complete search history.

(56) References Cited

U.S. PATENT DOCUMENTS

| | | | |
|---|---|---|---|
| 3,348,659 A | 10/1967 | Roinestad | |
| 3,664,487 A | 5/1972 | Ballenger | |
| 3,750,859 A | 8/1973 | Smith | |
| 4,036,352 A | 7/1977 | White | |
| 4,118,181 A | 10/1978 | Onodera | |
| 4,450,953 A | 5/1984 | LeCann et al. | |
| 4,741,430 A | 5/1988 | Roinestad | |
| 4,852,720 A * | 8/1989 | Roinestad | 198/778 |
| 4,941,566 A | 7/1990 | Irwin | |
| 4,981,208 A | 1/1991 | Jones | |
| 5,069,330 A | 12/1991 | Palmaer et al. | |
| 5,105,934 A * | 4/1992 | Cawley | 198/778 |
| 5,133,449 A * | 7/1992 | Spangler | 198/778 |
| 5,137,141 A * | 8/1992 | Irwin | 198/778 |
| 5,310,045 A | 5/1994 | Palmaer et al. | |
| 6,484,379 B2 | 11/2002 | Palmaer | |
| 6,796,418 B1 * | 9/2004 | Harrison et al. | 198/778 |
| 7,347,316 B2 | 3/2008 | Heber | |
| 2009/0038916 A1 | 2/2009 | VonFaassen | |
| 2011/0056806 A1 | 3/2011 | Johnson | |
| 2012/0006654 A1 | 1/2012 | Talsma | |

FOREIGN PATENT DOCUMENTS

| | | |
|---|---|---|
| EP | 1281641 A1 | 5/2003 |
| WO | 2013142136 A1 | 9/2013 |

* cited by examiner

*Primary Examiner* — James R Bidwell
(74) *Attorney, Agent, or Firm* — James T. Cronvich

(57) ABSTRACT

Overlapping cage-bar caps in a spiral belt conveyor. The cage bars of a spiral-conveyor cage are covered along the majority of their length by a main cage-bar cap fastened to the cage bar at the exit of the belt from the spiral. At the belt's entrance to the spiral, an entrance cage-bar cap overlaps a portion of the main cage-bar cap and the cage bar. The overlap is great enough to prevent a gap from forming along the length of the cage bar between the main cage-bar cap and the entrance cage-bar cap.

14 Claims, 3 Drawing Sheets

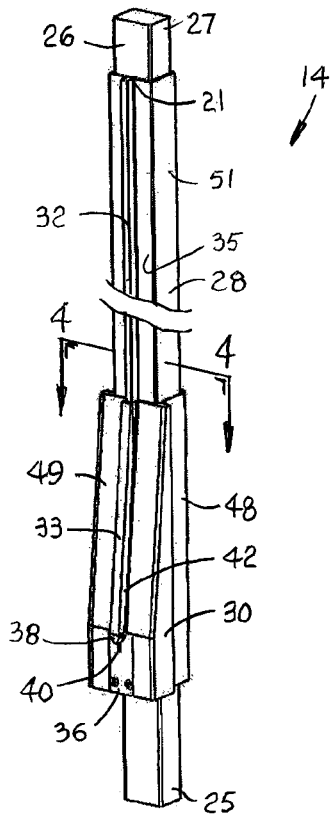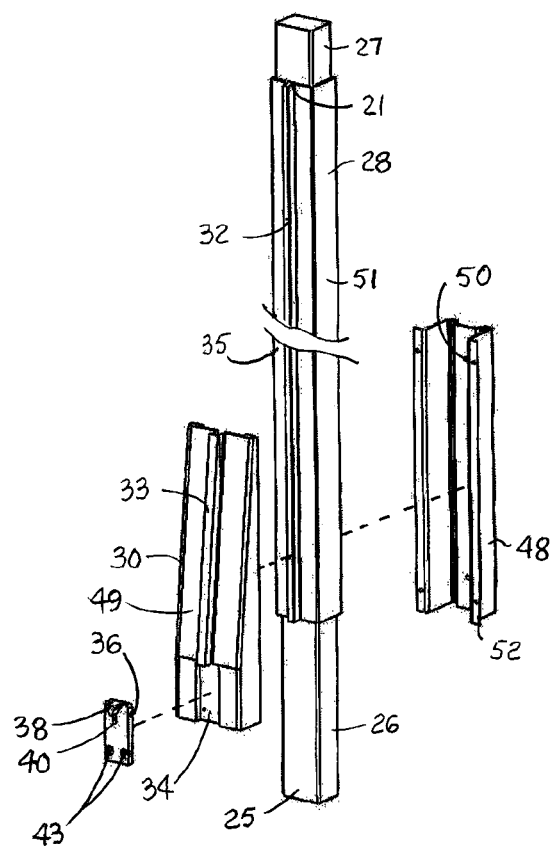
FIG. 2  FIG. 3
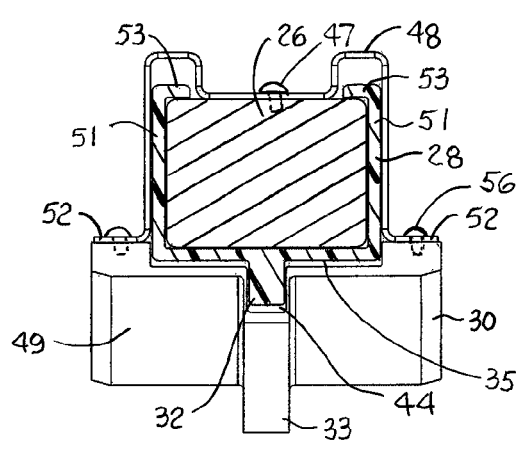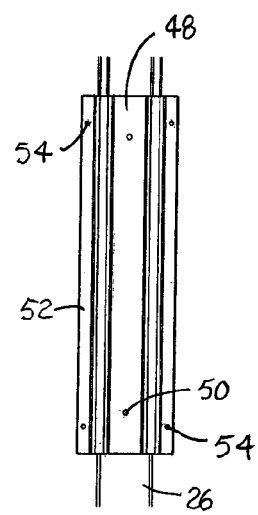
FIG. 4  FIG. 5

POSITIVE-DRIVE SPIRAL CONVEYOR WITH OVERLAPPING CAGE-BAR CAPS

BACKGROUND

The invention relates generally to power-driven conveyors and more particularly to spiral conveyors in which a conveyor belt is positively driven in a helical path around a rotating drive cage.

Positively driven spiral systems, in which drive structure on the outside of a rotating cage engages structure on the inside of a conveyor belt, have been used to convey articles, such as foodstuffs and other materials, through cooled or heated environments. Spiral conveyors, in which a conveyor belt follows a helical path winding around a central tower, drum, or cage, are used in freezers and ovens to provide a long conveying path with a small footprint. Cage bars extending from the top of the cage to the bottom are spaced apart circumferentially and form the outside of the cage. Cage-bar caps made of a plastic material cover the metal cage bars. Ridges on the cage-bar caps form drive structure that drives the belt. Because there is positive engagement between the regularly spaced drive structure on the cage and regularly spaced edge structure on the inside edge of the belt, there is no slip as in overdrive spiral systems. No additional tensioning is needed and frictional losses are less. But one problem with positively driven spiral systems is in cleanly engaging the belt with and disengaging it from the drive structure on the cage.

In prior attempts to help solve that problem, cage-bar caps 60, as shown in FIG. 6, were used at the entrance of the conveyor belt onto the rotating cage with alignment and guide features, such as a bump 62, that help guide the belt rows 63 into engagement with the drive surfaces 64 on the cage bars 66. Because the alignment and guide features make the entrance portion 60 of the cage-bar caps different from the much longer main portion of the cage-bar caps, it's more economical to have separate main portions 68 and entrance portions 60. The entrance cage-bar cap normally abuts the main cage-bar cap at a seam 70. But, when the spiral conveyor is operated in a freezer, the cage-bar caps 60, 68 contract and separate to form a gap 72, as shown in FIG. 7. The gap can catch on the belt's edge structure and hinder the belt's advancement vertically along the cage-bar caps.

SUMMARY

One version of a spiral conveyor embodying features of the inventions comprises a cylindrical drive cage that extends from a bottom to a top. The drive cage has parallel cage bars that extend in length from the bottom to the top of the drive cage and form a periphery radially outward of an axis of rotation of the drive cage. Main cage-bar caps cover a major portion of the lengths of the cage bars. Entrance cage-bar caps overlap a portion of the main cage-bar caps radially outward of the main cage-bar caps at the bottom or the top of the drive cage.

In another aspect of the invention, a cage-bar assembly for a spiral conveyor drive cage comprises a cage bar that extends in length from a first end to a second end. A first cage-bar cap covers a majority of the length of the cage bar between the first and second ends. A second cage-bar cap has an overlapping portion that covers a portion of the first cage-bar cap along the length of the cage bar at the first end.

And in another aspect, a method for constructing a cage bar for a spiral conveyor comprises: (a) covering a first length of a cage bar from a first end to a second end with a first cage-bar cap; (b) overlapping a portion of the first cage-bar cap at the first end of the cage bar with a second cage-bar cap; and (c) fastening the second cage bar cap to the cage bar.

BRIEF DESCRIPTION OF THE DRAWINGS

These and other features of the invention are described in detail in the following description, appended claims, and accompanying drawings, in which:

FIG. 2 is an isometric view of one of the cage-bar assemblies embodying features of the invention and usable in a spiral conveyor as in FIG. 1;

FIG. 3 is an exploded view of the cage-bar assembly of FIG. 2;

FIG. 4 is an enlarged cross section of the cage-bar assembly of FIG. 2 viewed along lines 4-4;

FIG. 5 is a rear elevation view of a lower portion of the cage-bar assembly of FIG. 2;

DETAILED DESCRIPTION

Figure 1:
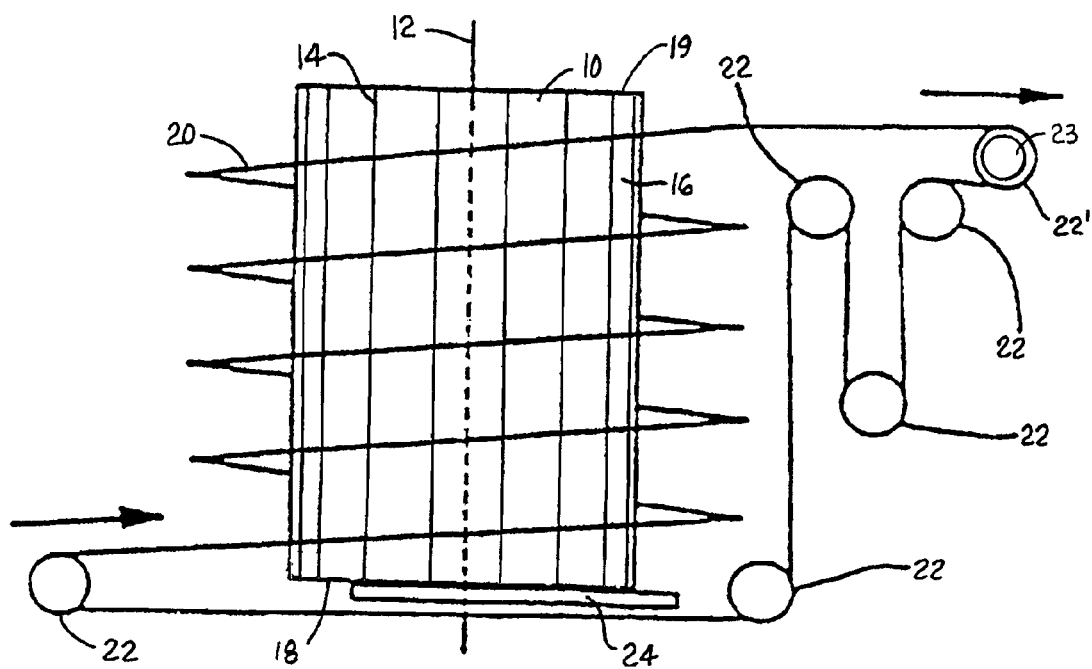
FIG. 1 is a side elevation schematic of a positively-driven spiral conveyor system.

A spiral conveyor is shown schematically in FIG. 1. The spiral conveyor includes a drive tower 10 in the form of a cylindrical cage that is driven to rotate about a vertical axis 12. The rotating cage has a plurality of parallel, generally vertical drive members 14 spaced apart regularly around its periphery 16. Each drive member extends in length between the bottom 18 and the top 19 of the cage. The conveyor belt 20 follows a multi-tiered helical path around the cage. The path is defined by a helical carryway or by a carryway at the bottom and stacker plates mounted on the belt. The inside edge of the belt positively engages the drive members, which drive the belt up the cage as it rotates. The belt travels around various take-up, idle, and feed sprockets 22 as it makes its way from the exit at the top of the cage back to the entrance at the bottom. The take-up sprockets 22' engage the belt after its exit from the helical path. The sprockets may be driven by a constant-torque motor 23 to prevent speed mismatches between the cage and the take-up motor from causing the belt to bunch up as it exits the helical path. The constant-torque motor auto-adjusts to any speed changes, such as those caused by temperature or other environmental changes. The cage 10 is mounted at its bottom to a base 24 and is rotated by a motor and gears (not shown). Further details of a spiral drive cage and conveyor belts suitable for use in the positive-drive spiral conveyor are provided in Published International Patent Application No. WO 2012/009222 A1, the disclosure of which is incorporated into this description by reference.

Figure 6:
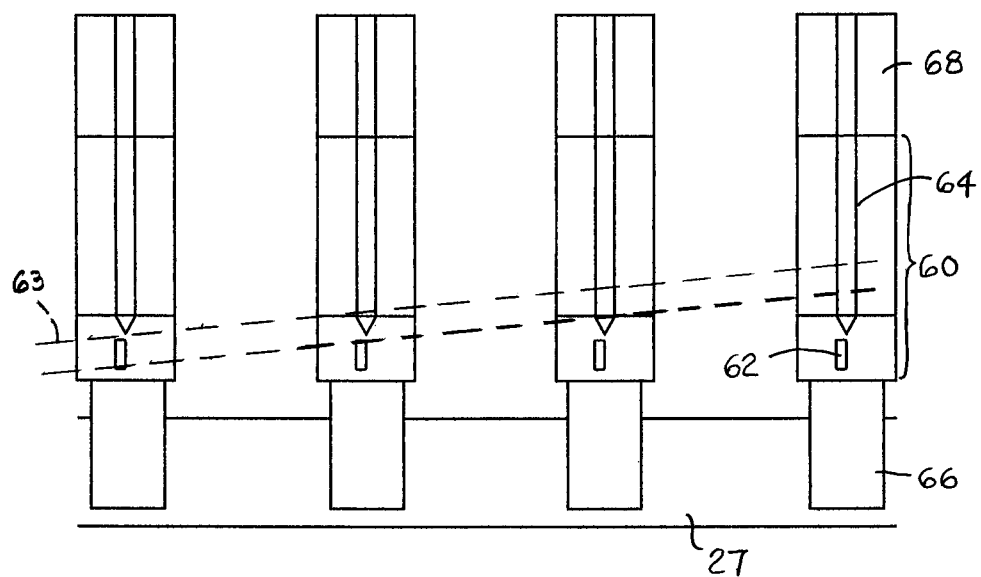
FIG. 6 is a side elevation view of a lower portion of a prior-art spiral conveyor system with non-overlapping, abutting cage-bar caps on each cage bar.
Figure 7:
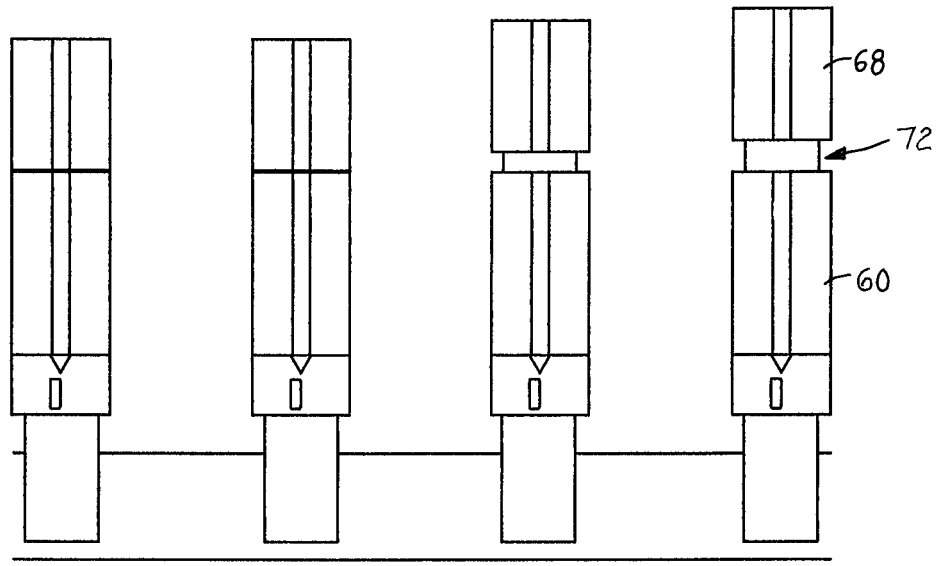
FIG. 7 is a side elevation view as in FIG. 6 in a low-temperature environment causing gaps to form between the entrance and main cage-bar caps.

As shown in FIGS. 2 and 3, each of the drive members 14 comprises a cage-bar assembly including a generally vertical cage bar 26, which is affixed at the bottom 18 of the cage to a lower ring, such as the ring 27 in FIG. 6, and at the top 19 to an upper ring of the drive cage, a main cage-bar cap 28, and an entrance cage-bar cap 30. Both cage-bar caps cover the cage bars and have ridges 32, 33 that protrude outward of front faces 35, 49 of the caps. The main cage-bar bar cap 28 extends the majority of the length of the cage bar from a bottom end 25 to a top end 27 and is fastened to the cage bar 26 by a fastener only at the top so that, as the main cage-bar cap expands and contracts with temperature, the disengagement point 21 of the belt from the cage doesn't change. In that way, the variation of the force required to pull the belt from the cage is limited to a reasonable range. Left and right side walls 51 extend from opposite sides of the front face of the main cage-bar cap 28 to cover the sides of the cage bar. Lips 53 at the rear end of each side wall 51 hook around the rear corners of the cage bar to hold the main cage-bar cap in place. Both cage-bar caps are made of a durable plastic material, such as a UHMW material.

The lower cage-bar cap 30 has a recess 34 for a replaceable insert 36, which forms a triangular tip end 38 of the aligned ridge 33 and has an alignment element such as a raised protrusion, or bump 40, below and circumferentially offset from the ridge. The bump cooperates with the tip end to guide the inside edge of the conveyor belt into positive engagement with the drive face 42 of the ridge 33, as schematically shown in FIG. 6. Countersunk screw holes 43 through the insert 36 admit flat-head screws that thread into the lower cage-bar cap 30 to hold the insert in place and to allow easy replacement when the tip end 38 and the bump wears down.

As best shown in FIGS. 3 and 4, the main cage-bar cap 28 fits over the cage bar 26 with its ridge 32 facing outward from the front face of the cap. At the lower end of the cage bar 26, the lower cage-bar cap 30 overlaps the main cage-bar cap 28. A slot 44 in the back side of the lower cage-bar cap 30 accommodates the main cage-bar cap's ridge 32. All or a portion of the length of the lower cage-bar cap 30 overlaps the main cage-bar cap 28 in the radial direction of the drive cage. A retainer, such as a bracket 48, fastened to the rear of the cage bar 26 by screws 47 through holes 50 has flanges 52 with holes 54 for screws 56 that thread into the rear of the lower cage-bar cap 30 to hold it in place. Because of the overlap, vertical gaps between the main cage-bar cap 28 and the lower cage-bar cap 30 do not form—even at low temperatures. Because the main cage-bar cap 28 is fastened to the cage bar 26 only at the other end 27 of the cage bar, the main cage-bar cap can slide between the cage bar and the lower cage-bar cap 30 as they expand and contract. The outer front face 49 of the lower cage-bar cap 30 tapers down from the entrance end upward. In this way, the belt edge's transition from the lower cap's ridge 33 to the main cap's ridge 32 is slight. The taper also makes the effective drive radius of the cage greater at the entrance into the cage than along the majority of the cage's height.

Although the invention has been described with references to an upgoing spiral conveyor, the overlapped entrance cage-bar caps could be located upside down at the top of the cage in a downgoing spiral conveyor. So the overlapping upper or lower cage-bar cap can generally be referred to as the entrance cage-bar cap. Furthermore, the benefits of overlapping cage-bar caps apply to cage bars of different configurations. For example, an overlapping entrance cage bar without an alignment bump, a replaceable insert, or a tapered outer surface would benefit from the overlap. As these few examples suggest, the claims are not meant to be limited to the details of the exemplary versions.

What is claimed is:

1. A spiral conveyor comprising:
    a cylindrical drive cage extending from a bottom to a top and having a plurality of parallel cage bars extending in length from the bottom to the top of the drive cage forming a periphery radially outward of an axis of rotation of the drive cage;
    a plurality of main cage-bar caps covering a major portion of the lengths of the cage bars,
    a plurality of entrance cage-bar caps overlapping a portion of the main cage-bar caps radially outward of the main cage-bar caps and disposed at the bottom or the top of the drive cage.

2. A spiral conveyor as in claim 1 wherein the main cage-bar caps each have an outer surface with a ridge extending parallel to the length of the cage bar and wherein the entrance cage-bar caps each have a slot extending parallel to the length of the cage bar to receive the overlapped ridge on the overlapped portion of the main cage-bar cap.

3. A spiral conveyor as in claim 2 wherein the entrance cage-bar caps each include a ridge aligned with the ridge on the overlapped main cage-bar cap.

4. A spiral conveyor as in claim 1 comprising a plurality of retainers each fastened to a radially interior side on one of the cage bars and to a radially inner side of one of the entrance cage-bar caps to retain the entrance cage-bar cap in place overlapping the main cage-bar cap.

5. A spiral conveyor as in claim 1 wherein the entrance cage-bar caps have ridges defining a first outer radius of the drive cage proximate the bottom or the top and a second outer radius distal from the bottom or the top, wherein the first outer radius is greater than the second outer radius.

6. A spiral conveyor as in claim 5 wherein the entrance cage-bar caps each have an outer surface that tapers radially inward away from the entrance end.

7. A spiral conveyor as in claim 1 wherein the main cage-bar caps are fastened to the cage bars only at a point near the ends of the main cage-bar caps not overlapped by the entrance cage-bar caps.

8. A cage-bar assembly for a spiral conveyor drive cage, comprising:
    a cage bar extending in length from a first end to a second end;
    a first cage-bar cap covering a majority of the length of the cage bar between the first and second ends;
    a second cage-bar cap having an overlapping portion covering a portion of the first cage-bar cap along the length of the cage bar at the first end.

9. A cage-bar assembly as in claim 8 further comprising a retainer fastened to the cage bar and to the second cage-bar cap to retain the second cage-bar cap in place sandwiching the cage bar and the overlapped portion of the first cage-bar cap between the retainer and the second cage-bar cap.

10. A cage-bar assembly as in claim 8 wherein the first cage-bar cap has a ridge extending parallel to the length of the cage bar on an outer side and wherein the second cage-bar cap has a slot extending parallel to the cage bar on an inner side to receive the ridge of the overlapped portion of the first cage-bar cap.

11. A cage-bar assembly as in claim 8 wherein the second cage-bar cap has a ridge that decreases in distance from the cage bar along the length of the cage bar.

12. A cage-bar assembly as in claim 8 wherein the first cage-bar cap is fastened to the cage bar at the second end of the cage bar.

13. A method for constructing a cage bar for a spiral conveyor, comprising:
    covering a first length of a cage bar from a first end to a second end with a first cage-bar cap;
    overlapping a portion of the first cage-bar cap at the first end of the cage bar with a second cage-bar cap;
    fastening the second cage bar cap to the cage bar.

14. The method of claim 13 further comprising fastening the first cage-bar cap to the cage bar only at the second end of the cage bar.

* * * * *